UNITED STATES PATENT OFFICE.

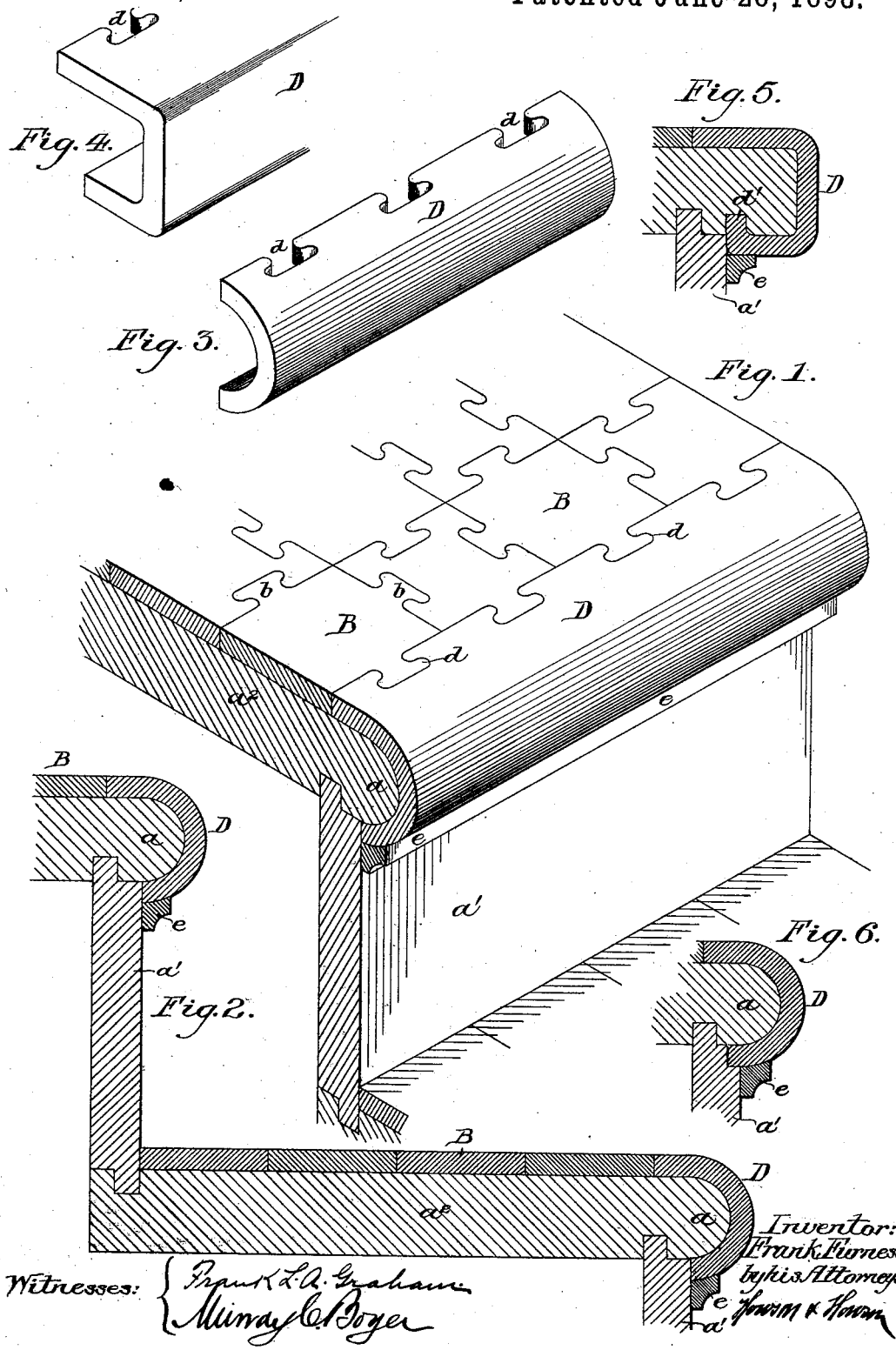

FRANK FURNESS, OF PHILADELPHIA, PENNSYLVANIA.

NOSING-STRIP FOR STAIRWAYS.

SPECIFICATION forming part of Letters Patent No. 606,532, dated June 28, 1898.

Application filed October 2, 1897. Serial No. 653,788. (No model.)

*To all whom it may concern:*

Be it known that I, FRANK FURNESS, a citizen of the United States, residing in Philadelphia, Pennsylvania, have invented certain Improvements in Nosing-Strips for Stairways, of which the following is a specification.

The object of my invention is to make a protecting-strip of rubber or equivalent material to be applied to the nosing of the steps of a stairway.

While my invention is especially adapted to metal or stone steps which are provided with rubber or other tile treads, it may be used on tiled wooden steps.

Heretofore the common practice has been to simply tile the body of the tread of a step, leaving the edge and nosing exposed. This is objectionable, as in many instances the edge or nosing of the step becomes very smooth and accidents often occur. By my invention I am enabled to make the entire tread, including the nosing, of rubber or equivalent material, the body of the tread being made of rubber tile—such, for instance, as that described in my Patent No. 527,961, dated October 23, 1894.

Referring to the accompanying drawings, Figure 1 is a sectional perspective view of a step, illustrating my invention. Fig. 2 is a sectional view of a portion of a stairway shown in Fig. 1. Fig. 3 is a perspective view of a nosing-strip made from a tube. Figs. 4 and 5 are modified forms of the strip, and Fig. 6 is a view of another method of applying the strip.

A is the step of a stairway, having the usual rounded nose $a$, extending beyond the riser $a'$. The tread $a^2$ of the step is covered with interlocked rubber tiling B. Some of these tiles have undercut tongues $b$, adapted to undercut recesses in other tiles, so that when the tiles are placed in position they interlock.

As before remarked, the tiles have been usually set in a recess formed in the tread, leaving the nose of the step exposed.

In order to cover the entire tread, including the nose, I form, preferably by molding, a strip of rubber or equivalent material D and notch one edge, forming recesses $d$ at intervals, into which the tongues $b$ of the tiles are fitted, so as to lock the nosing-strip D to the tiles B. The lower edge of this strip is preferably confined in place under the nose of the step by a strip or molding $e$, which is suitably fastened to the step. The nosing-strip can be cemented in place, as well as secured by the interlocking tongues and the molding. By this means I am enabled not only to lock the molding at the upper edge to the tiles, but I am also enabled to fasten the tiles at the outer edge of the tread of the stairway and not depend solely upon cement, as heretofore.

As in Figs. 1 and 2, the upper edge of the strip in which the recesses $d$ are formed is extended, so that the joint between the tiles and strip will be flat, although I may make the strip as shown in Fig. 3, in which case I preferably first make a tube having the inner diameter of the same radius as the nosing of the step to be covered. Then I cut the tube longitudinally, so as to make two sections, and each of these sections I notch at intervals, as shown in Fig. 1, so that they will interlock with the tiles on the tread of the steps.

In Fig. 4 I have shown a square-edged nosing-strip, and in Fig. 5 I have shown a strip having a lip $d'$, which enters a groove in the under side of the nosing. In this case the molding-strip $e$ may be dispensed with.

In Fig. 6 I have shown the strip resting in a groove in the riser and secured by the molding-strip.

I claim as my invention—

1. The combination of a step, a nosing-strip adapted to the nosing of the step and having notches in one edge, with a tread-section meshing with the notches in the edge of the nosing-strip, substantially as described.

2. The combination of a step, a strip of rubber or equivalent material adapted to be secured to the nosing of a step, having its upper edge extended, with undercut recesses in the extended edge and means on the tread with which the undercut portions of the nosing-strip engage, substantially as described.

3. The combination of a step, interlocked rubber tiles thereon, a rubber nosing-strip adapted to the nosing of the step and locked to the tiles, substantially as described.

In testimony whereof I have signed my name to this specification in the presence of two subscribing witnesses.

FRANK FURNESS.

Witnesses:
WILL. A. BARR,
JOS. H. KLEIN.